United States Patent

Larson et al.

[11] Patent Number: 5,845,998
[45] Date of Patent: Dec. 8, 1998

[54] BALL BEARING ASSEMBLY WITH POLYMER BEARING RING

[75] Inventors: John A. Larson, Collinsville; Maksimilijan Godec, Torrington; Walter P. Waskiewicz, Bristol, all of Conn.

[73] Assignee: The Torrington Company, Torrington, Conn.

[21] Appl. No.: 757,783

[22] Filed: Nov. 27, 1996

[51] Int. Cl.$^6$ .................................................. F16C 33/62

[52] U.S. Cl. ..................... 384/492; 384/496; 384/501; 384/909

[58] Field of Search ...................................... 384/496, 501, 384/492, 909, 498, 499

[56] References Cited

U.S. PATENT DOCUMENTS

| | | |
|---|---|---|
| 3,606,502 | 9/1971 | De Germond . |
| 3,885,840 | 5/1975 | Neder . |
| 3,924,908 | 12/1975 | Gotham et al. . |
| 4,025,135 | 5/1977 | Hishida . |
| 4,113,328 | 9/1978 | Vander Meulen . |
| 4,489,992 | 12/1984 | Brandenstein et al. . |
| 4,652,152 | 3/1987 | Brandenstein et al. . |
| 4,715,780 | 12/1987 | Kan . |
| 5,071,624 | 12/1991 | Franke et al. . |

*Primary Examiner*—Lenard A. Footland
*Attorney, Agent, or Firm*—John C. Bigler

[57] ABSTRACT

A ball bearing assembly includes a polymer outer bearing ring molded over and partially enclosing a metal annular outer raceway. The metal annular outer raceway may be economically formed from sheet metal or wire. The polymer outer bearing ring may be mounted within a metal housing to provide support and/or self-alignment capability.

9 Claims, 2 Drawing Sheets

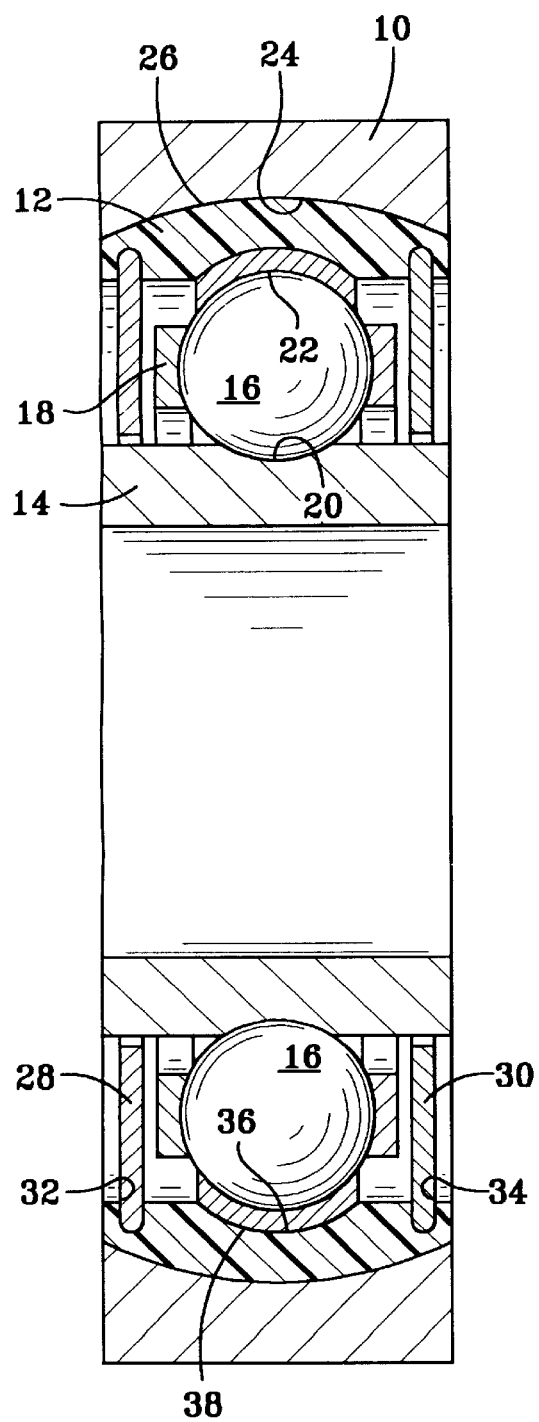 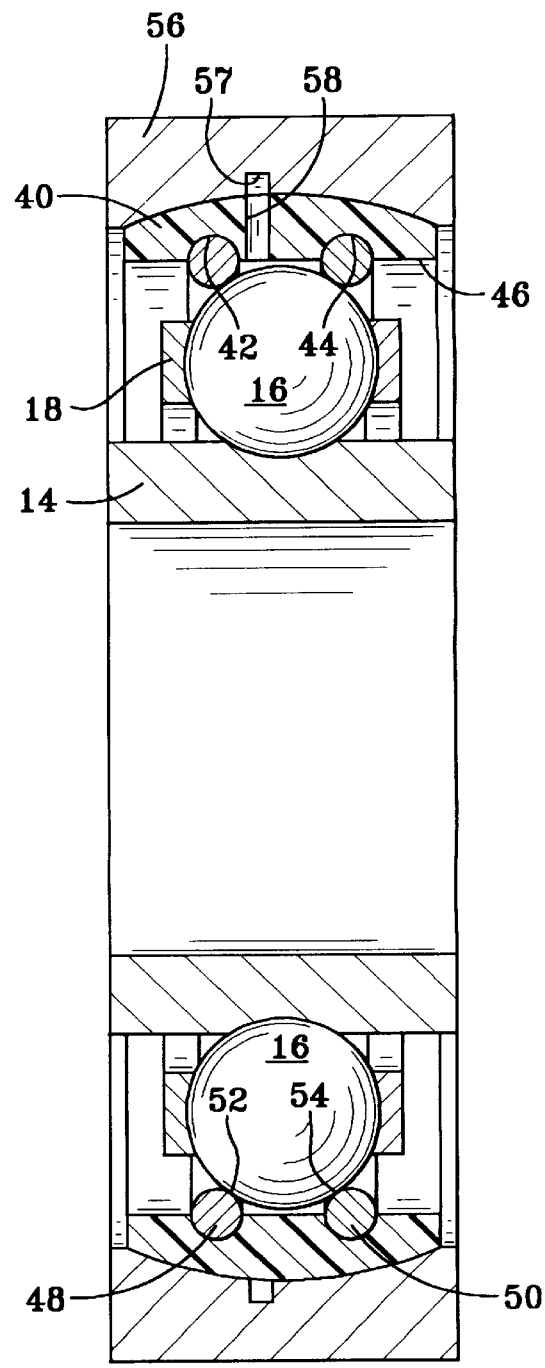
*FIG. 1*  *FIG. 2*

BALL BEARING ASSEMBLY WITH POLYMER BEARING RING

BACKGROUND OF THE INVENTION

This invention relates generally to ball bearings. More particularly, this invention is a new ball bearing assembly having a polymer outer bearing ring and a metal outer raceway.

Conventional ball bearings have bearing rings made of steel. The steel rings are machined and heat treated, the raceways are precisely ground, and the bearing rings are hardened to provide the ring strength required for heavily loaded applications. The bearing quality steel material and the many manufacturing steps contribute to the high cost of ball bearings.

Many applications require much less ring strength than the ring strength of the steel rings of conventional ball bearings. However, because the part of the bearing ring contacted by the balls (the "raceways") must be hardened and finished even for lightly loaded applications, conventional ball bearings are still used. Accordingly, there is a need for a less expensive ball bearing for such applications.

The foregoing illustrates limitations known to exist in present ball bearings and methods of making ball bearings. Thus, it is apparent that it would be advantageous to provide an alternative directed to overcoming one or more of the limitations set forth above. A suitable alternative is provided including features more fully disclosed hereinafter.

SUMMARY OF THE INVENTION

In one aspect of the invention, this is accomplished by providing a ball bearing assembly comprising a metal inner bearing ring having an inner raceway, a metal annular outer raceway and a polymer outer bearing ring molded over and partially enclosing the metal annular outer raceway. A plurality of balls are in rolling contact with the inner raceway and the metal annular outer raceway. The metal annular outer raceway may be formed of sheet metal or wire. The polymer outer bearing ring may be mounted within a metal housing to provide support and/or self-alignment capability.

The foregoing and other aspects will become apparent from the following detailed description of the invention when considered in conjunction with the accompanying drawing figures.

BRIEF DESCRIPTION OF THE DRAWING FIGURES

FIG. 1 is a sectional view of a bearing assembly illustrating a preferred embodiment of the present invention;

FIG. 2 is a sectional view of a bearing assembly illustrating a second preferred embodiment of the present invention;

DETAILED DESCRIPTION

Figure 3:
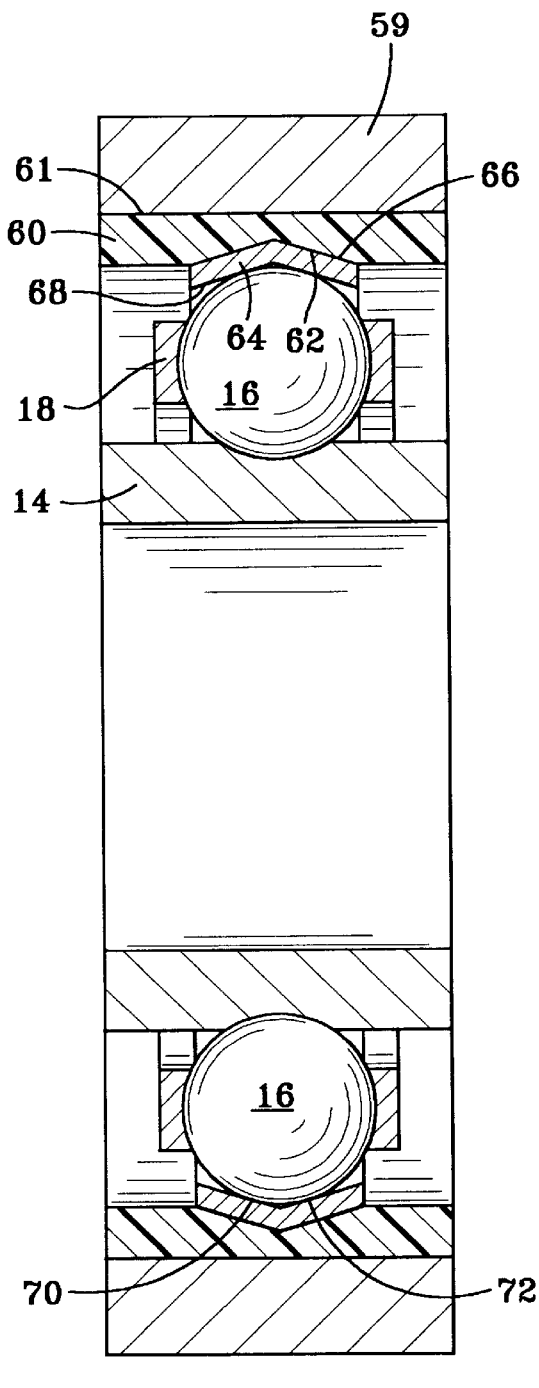
FIG. 3 is a sectional view of a bearing assembly illustrating a third preferred embodiment of the present invention.

Referring now to the drawings, FIG. 1 shows a bearing assembly including metal housing 10 and a ball bearing. The ball bearing has polymer outer bearing ring 12 and metal inner bearing ring 14. A plurality of circumferentially separated balls 16, retained by optional ball cage 18, are in rolling contact with annular inner raceway 20 on inner bearing ring 14 and metal annular outer raceway 22, partially enclosed by polymer outer bearing ring 12.

Polymer outer bearing ring 12 is slidably retained in metal housing 10 to provide support and self-alignment of the bearing. Metal housing 10 has an annular, spherically concave inside surface 24, and polymer outer bearing ring 12 has spherical outer surface 26 corresponding in shape to the housing spherically concave inside surface. If desired, annular seals 28 and 30 of various conventional designs may be fitted into annular grooves 32 and 34, respectively, adjacent each axial end of polymer outer bearing ring 12.

Polymer outer bearing ring 12 is formed by molding a polymer about metal annular outer raceway 22. The polymer outer bearing ring has an annular, concave radially inner surface 36. Metal annular outer raceway 22 has an annular, convex radially outer surface 38 corresponding in shape to the polymer outer bearing ring annular, spherically concave inside surface. Metal annular outer raceway 22 also has an annular, concave radially inner surface corresponding in shape, in cross-section, to the curvature of balls 16.

The metal annular outer raceway of each of the preferred embodiments may be positioned in an injection molding tool and an appropriate polymer then molded around the metal annular outer raceway to produce the finished outer bearing ring. The molding can incorporate any structural features desired such as, for example, lubrication grooves or holes and seal grooves. The selected polymer need only possess the physical, chemical, and thermal properties needed to meet the demands of the application for which the bearing assembly is intended.

In the preferred embodiment of FIG. 2, polymer outer bearing ring 40 has a pair of axially spaced annular grooves 42 and 44 in its radially inner surface 46. The metal annular outer raceway in this embodiment consists of metal rings 48 and 50 molded in grooves 42 and 44, respectively. Metal rings 48 and 50 each have a circular cross-section so that approximately half of each metal ring protrudes radially inwardly from the radially inner surface of the polymer outer bearing ring. Balls 16 are in rolling contact with metal rings 48 and 50 at two ball contact points 52 and 54, respectively. Though metal rings 48 and 50 are axially separated, the balls do not contact polymer outer bearing ring 40.

In the embodiment of FIG. 3, metal housing 59 has a cylindrical bore extending through it. Polymer bearing ring 60 has cylindrical outside surface 61 supported by and fixed to housing 59. Polymer outer bearing ring 60 has an annular V-shaped groove 62 in its radially inner surface. Metal annular outer raceway 64 has a V-shaped cross-section. Radially outer surface 66 of the metal annular outer raceway corresponds to the shape of V-shaped groove 62 in polymer outer bearing ring 60. Radially inner surface 68 of the metal annular raceway provides a two point contact at contact points 70 and 72 on balls 16.

Figure 4:
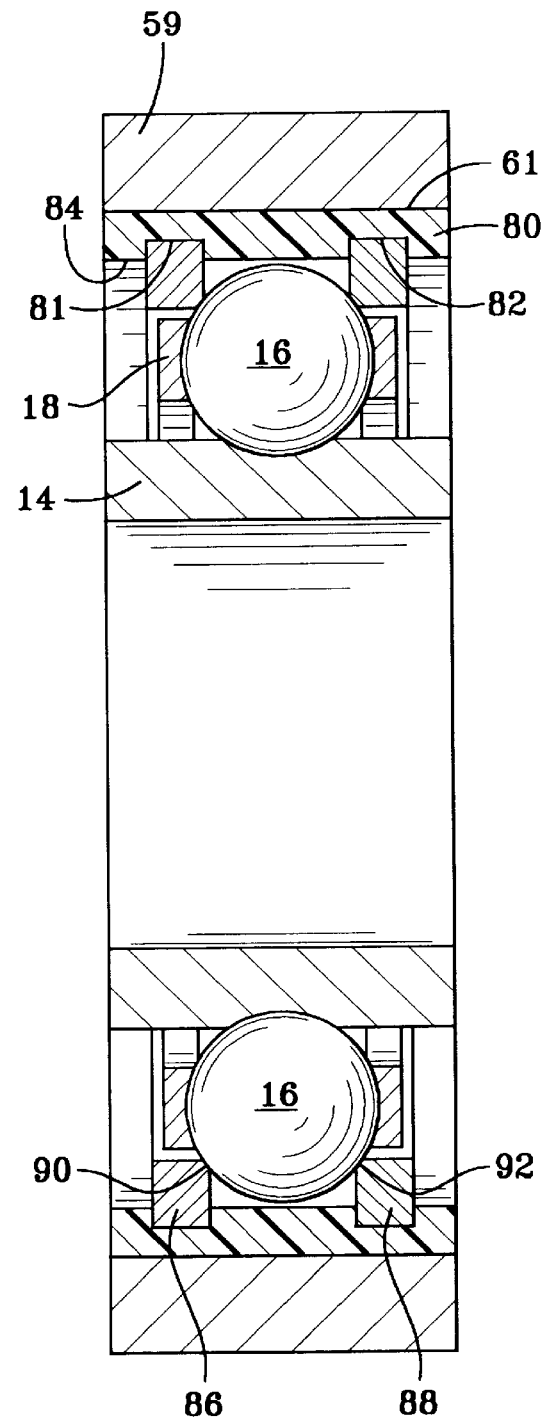
FIG. 4 is a sectional view of a bearing assembly illustrating a fourth preferred embodiment of the present invention.

In the embodiment of FIG. 4, polymer outer bearing ring 80 has a pair of axially spaced annular rectangular grooves 80 and 82 on its radially inside annular surface 84. The metal annular raceway consists of metal rings 86 and 88 in grooves 80 and 82, respectively. The axial dimension of each metal ring is substantially the same as the axial dimension of the corresponding groove. The radial dimension of each metal ring is greater than the radial dimension of the corresponding groove thereby providing a raised surface. Balls 16 ride on a chamfer or radius of metal rings 86 and 88 at two ball contact points 90 and 92.

Preferably, the metal annular outer raceways of each of the preferred embodiments described herein are hardened and finished to standard bearing requirements. The metal annular outer raceways may be formed economically from sheet metal or wire, wrapped in a hoop and welded, by conventional methods prior to molding the polymer outer bearing ring over the metal annular outer raceways.

Having described the invention, what is claimed is:

1. A ball bearing assembly comprising;
   a metal inner bearing ring having an inner raceway;
   a metal annular outer raceway;
   a polymer outer bearing ring partially enclosing the metal annular outer raceway, the polymer outer bearing ring having a spherically convex outer surface;
   a plurality of balls in rolling contact with the inner raceway and the metal annular outer raceway; and
   a metal housing with a spherically concave inner surface slidably mounted against the polymer outer bearing ring spherically convex outer surface.

2. A ball bearing assembly in accordance with claim 1 wherein:
   the polymer outer bearing ring has an annular concave radially inside surface, the metal annular outer raceway having an annular convex radially outside surface corresponding in shape to the polymer outer bearing ring annular concave inside surface and an annular concave radially inside surface corresponding in shape to the curvature of the balls.

3. A ball bearing assembly in accordance with claim 1 wherein the polymer outer bearing ring has a pair of axially spaced annular grooves in its radially inside surface, and wherein the metal annular outer raceway consists of a metal ring having a circular cross-section molded in each of the axially spaced annular grooves so that a portion of each metal ring protrudes radially inwardly from the radially inside surface of the polymer ring such that the metal rings provide a two point ball contact.

4. A ball bearing assembly in accordance with claim 1 wherein the polymer outer bearing ring has an annular V-shaped groove in its radially inside surface, and wherein the metal annular raceway has a V-shaped cross-section and the radially outer surface of the metal annular outer raceway corresponding in shape to the shape of the V-shaped groove such that the radially inner surface of the metal annular outer raceway provide a two point ball contact.

5. A ball bearing assembly in accordance with claim 1 wherein the polymer bearing ring has a pair of axially spaced annular rectangular grooves on its radially inner surface, and wherein the metal annular outer raceway consists of a metal ring molded in each of the rectangular grooves, the axial dimension of each metal ring being substantially the same as the axial dimension of the corresponding groove, and the radial dimension of each metal ring being greater than the radial dimension of the corresponding groove thereby providing a two point ball contact.

6. A ball bearing assembly in accordance with claim 1 wherein the metal annular outer raceway is formed from sheet metal.

7. A Ball bearing assembly in accordance with claim 1 wherein the metal annular outer raceway is formed from wire.

8. A ball bearing assembly in accordance with claim 1, wherein the polymer outer bearing ring is formed by molding a polymer about the metal annular outer raceway.

9. A ball bearing assembly in accordance with claim 1, wherein the polymer outer bearing ring has a relubrication passage such that lubricant can pass through the polymer outer bearing ring to the balls.

* * * * *